(No Model.)

J. B. GILLESPIE.
HORSESHOE.

No. 557,665. Patented Apr. 7, 1896.

WITNESSES:
J. C. Whittenberger
Jas N Rose

INVENTOR
James B. Gillespie
BY C D Levis
ATTORNEY.

UNITED STATES PATENT OFFICE.

JAMES B. GILLESPIE, OF EAST LIVERPOOL, OHIO.

HORSESHOE.

SPECIFICATION forming part of Letters Patent No. 557,665, dated April 7, 1896.

Application filed August 3, 1895. Serial No. 558,058. (No model.)

*To all whom it may concern:*

Be it known that I, JAMES B. GILLESPIE, a citizen of the United States, residing at East Liverpool, in the county of Columbiana and State of Ohio, have invented certain new and useful Improvements in Horseshoes; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to certain new and useful improvements in horseshoes, and has for its object the provision of new and novel means whereby a horseshoe may be constructed in two sections and thereby providing the option of either the ordinary shoe with corks and toe or the plate-shoe for track-driving.

A further object of the invention is to provide a horseshoe of the above-referred-to class whereby the two sections can be securely locked together and retained in position.

A still further object of the invention is to construct a shoe, as described, that will be simple in its construction, strong, durable, comparatively inexpensive to manufacture, and effectual in its operation.

With the above and other objects in view the invention finally consists in the novel construction, combination, and arrangement of parts to be hereinafter more particularly described, and specifically pointed out in the claims.

In describing the invention in detail reference is had to the accompanying drawings, forming a part of this specification, and wherein like figures of reference indicate similar parts throughout the several views, in which—

Figure 1:
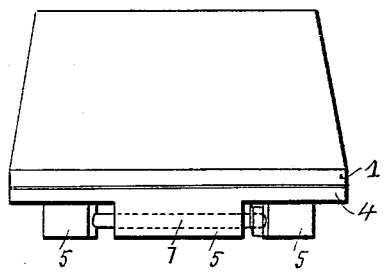
Figure 2:
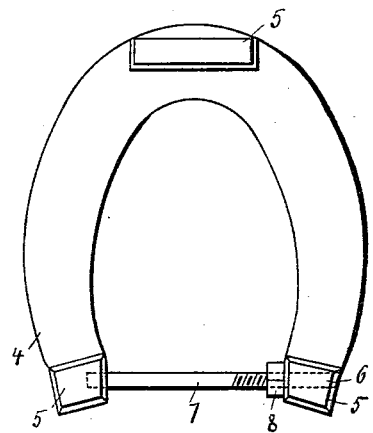
Figure 3:
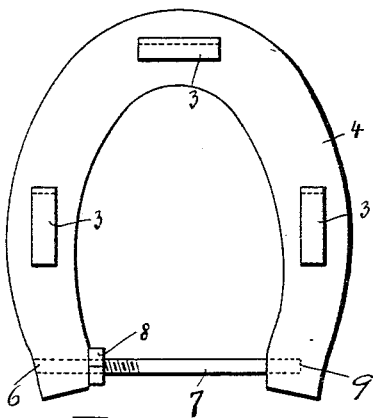
Figure 5:
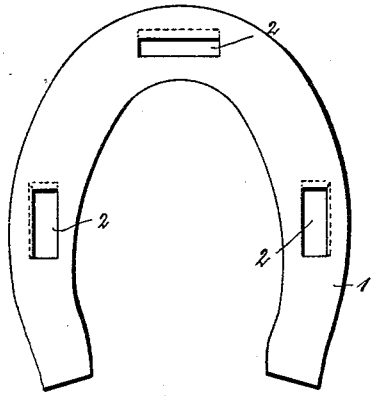
Figure 4:
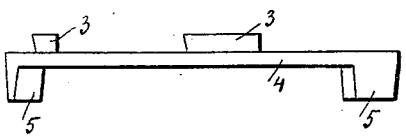
Figure 6:
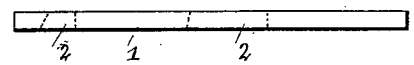

Figure 1 is a front view. Fig. 2 is an underneath plan view. Fig. 3 is a plan view of the outer shoe. Fig. 4 is a side view of Fig. 3. Fig. 5 is an underneath view of the plate. Fig. 6 is a side view of Fig. 5.

In the drawings, 1 represents the plate which is attached to the hoof of the horse by nails in the ordinary and well-known manner. The said plate contains slots 2 2 2 for the reception of the pins 3 3 3 on the outer shoe 4. The pins 3 3 3 are constructed so that when inserted in the slots 2 2 2 they will form a dovetail and retain the shoe 4 on the plate 1. Through one of the corks 5 5 of the shoe 4 is a hole 6, in which is inserted a bolt or pin 7, which is screw-threaded for a short distance near the cork for the reception of the nut or bur 8. The bolt or pin 7 is of a smaller diameter at the smooth end, so as to allow the removal of the nut and bolt. The bolt is secured in position by inserting the smaller end into the hole 9 in the opposite cork.

Operation: When it is desired to use my improved horseshoe, the plate constructed as above described is nailed to the hoof, and the outer shoe attached thereto by means of the pins 3 3 3 being inserted into the slots 2 2 2. The nut or bur 8 is then loosened, which will allow the smaller end of the bolt or pin 7 to be inserted in the hole 9 of the cork. The bur is then screwed tightly against the opposite cork, and by this means the outer shoe 4 will be rigidly retained in its position against the plate 1. When it is desired to remove the outer shoe, it will be observed that by loosening the nut or bur the bolt can be released from its engagement with the corks, which will allow the removal of the outer shoe from the plate.

It will be noted that various changes may be made in the details of construction of my improved horseshoe without departing from the general spirit of my invention.

Having fully described my invention, what I claim as new, and desire to secure by Letters Patent, is—

1. In a horseshoe formed of two sections, a plate having slots for the reception of the lugs on the outer shoe thereby forming a dovetail, and a pin or bolt serving to expand the outer shoe and lock the same, substantially as shown and described.

2. In a horseshoe formed of two sections, the combination of the plate having slots for the reception of the lugs on the outer shoe, the said outer shoe being provided with calks, and one of said calks having an aperture for the reception of the bolt or pin, the opposite calk having a hole forming a bearing for the reception of the end of said bolt or pin, substantially as described and shown.

In testimony whereof I affix my signature in presence of two witnesses.

JAMES B. GILLESPIE.

Witnesses:
S. C. WHITTENBERGER,
H. LYON.